United States Patent [19]

Inscho et al.

[11] 4,356,372
[45] Oct. 26, 1982

[54] SHEILED-ARC TUBE WELDER WITH INTERMEDIATE GAS SUPPLY

[75] Inventors: Howard P. Inscho, Steuben; Lucas H. Van Rhyn, Livingston, both of N.Y.

[73] Assignee: Foster Wheeler Energy Corporation, Livingston, N.J.

[21] Appl. No.: 99,798

[22] Filed: Dec. 3, 1979

[51] Int. Cl.³ .............................................. B23K 9/16
[52] U.S. Cl. ................................... 219/60 R; 219/75; 219/137.42
[58] Field of Search ................... 219/60 R, 61, 74, 75, 219/137.42, 121 PJ, 121 PK, 121 PQ; 228/48

[56] References Cited

U.S. PATENT DOCUMENTS

| | | | |
|---|---|---|---|
| 2,906,852 | 9/1959 | Cornell et al. | 219/61 |
| 3,238,349 | 3/1966 | Anderson et al. | 219/75 |
| 3,534,200 | 10/1970 | Wagenleitner et al. | 219/75 |
| 3,571,556 | 3/1971 | Wustner | 219/75 X |
| 3,692,973 | 9/1972 | Oku et al. | 219/75 X |
| 3,794,806 | 2/1974 | Klasson | 219/75 X |
| 3,825,712 | 7/1974 | Gibbs | 219/74 X |
| 4,050,958 | 9/1977 | Shimada et al. | 219/75 X |
| 4,110,590 | 8/1978 | Batey et al. | 219/75 |

FOREIGN PATENT DOCUMENTS

| | | | |
|---|---|---|---|
| 52-76242 | 6/1977 | Japan | 219/74 |
| 54-17341 | 2/1979 | Japan | 219/74 |
| 54-135642 | 10/1979 | Japan | 219/61 |
| 54-151532 | 11/1979 | Japan | |

OTHER PUBLICATIONS

*Metals Handbook*, 8th Edition, vol. 6, "Welding and Brazing", American Society for Metals; Metals Park, Ohio; 1971; p. 141.

Primary Examiner—G. Z. Rubinson
Assistant Examiner—Keith E. George

[57] ABSTRACT

Welding apparatus includes a welder and an electrically pre-heated wire that is fed into the perimeter of a weld puddle. The apparatus has equipment to produce relative motion between the welder and the workpiece. A stream of gas, such as a mixture of inert gas and oxygen, is applied to the weld puddle at a location between the welder and the pre-heated wire. Pipes may be rapidly welded in an end to end fashion using such apparatus by rotating the pipes past the welder. The welder is mounted at the side of the joint of the pipes and the pipes are rotated so that the portion thereof adjacent to the welder translates upwardly. The electrically pre-heated wire is fed into the melted portion of the joint which trails the welder.

14 Claims, 1 Drawing Figure

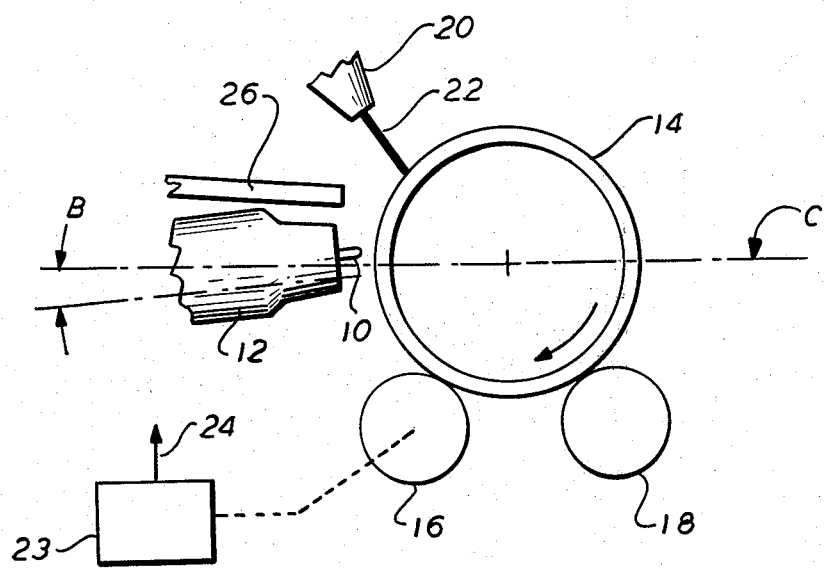

SHEILED-ARC TUBE WELDER WITH INTERMEDIATE GAS SUPPLY

BACKGROUND OF THE INVENTION

The present invention relates to welding apparatus and welding methods, and, in particular, to techniques for welding at high speed.

It is known to weld adjacent sections of metal by employing an arc emanating from an electrode shielded by an inert gas. The joint formed by such an arc welder often has a central depression of furrow caused by the running of melted material. It is also well known to introduce an electrically pre-heated filler wire into the weld puddle to elevate the profile of the weld seam, making the cross-section of the joint more uniform with the rest of the workpiece.

A problem frequently encountered in high speed welding is that the intense heat required to rapidly melt the material being joined tends to create a significant weld puddle which can run. In the situation where pipe is being butt welded, this tendency to run is exacerbated since there is always a down hill path for the weld puddle to follow. Known apparatus attempts to restrain the weld puddle by injecting the inert shielding gas that typically surrounds an electrode from a conduit which is spaced from that electrode. The back pressure caused by this flow of inert gas along the workpiece and toward the electrode tends to keep the puddle around the electrode. While this technique is satisfactory for some applications, it may be deleterious in other applications and fails to consider advantages which can arise from a gaseous flow that does not envelop the electrode.

Apparatus to butt weld pipe has had significant problems. Frequently such machines much operate at a low speed or with pipes whose ends are bevelled to obtain satisfactory welds. These butt welders are of two general types, viz. the relative motion between a welding head and pipe is caused by either revolving a weld head around the pipes or by rotating the pipes. In either situation difficulty has been encountered in producing satisfactory and consistent welds when the welding speed is relatively high.

SUMMARY OF THE INVENTION

In accordance with the illustrative embodiments demonstrating features and advantages of the present invention there is provided a welding apparatus for forming a joint between two sections. This welding apparatus has a weld means for welding together portions of these two sections that are adjacent to the weld means. Also included is a feed means that is spaced a given distance from the weld means. This feed means feeds wire into a melted portion of a joint. A translation means is included for producing relative motion between the joint and the weld means. The welding apparatus also includes an intermediate means for applying a stream of gas to the joint in a location between the feed means and the weld means. This stream of gas is directed to restrict flow of the gas toward the weld means.

Welding apparatus also according to the present invention operates to form a joint between two tubular sections. This apparatus has a translation means that horizontally supports and aligns together these two tubular sections. The translation means is operable to synchronously rotate the two tubular sections about their axes. A weld means is mounted along that side of the joint which translates upwardly upon rotation thereof by the translation means. A feed means is also included for feeding electrically heated wire into the melted portion of the joint above the weld means and at a distance sufficient to allow the wire to melt without running downwardly to interfere with the weld means.

By employing such apparatus the present invention is able to weld sections together at a relatively high speed. The introduction of a stream of gas at a position away from the welder helps to control the flow of the weld puddle. In addition, since the stream of gas may be directed to avoid flowing of the puddle toward the welder, it avoids the buildup of a large weld puddle that can interfere with the welding operation. Moreover, since the gaseous flow can be directed away from the welder, gasses such as a mixture of 95% argon and 5% oxygen may be used without causing deterioration of the welder or its welding electrode. Use of a medium such as oxygen is expected to facilitate penetration by causing a superficial oxide coating that aids wetting and penetration. It is also expected that the stream of external gas causes cooling of the trailing portion of the weld puddle making it easier to control and manipulate.

For the situation where pipe is being butt welded, apparatus according to the principles of the present invention can consistently weld together unbevelled pipe. Also, positioning the welder to the side of the pipe and rotating the pipe so that it translates upwardly past the welder provides effective control of the weld puddle. Rotation in the other direction tends to cause excessive heating and the formation of an excessively large weld puddle in advance of the welder.

Also, according to a preferred embodiment, the current applied to an arc welder is progressively reduced in response to progressive rotation of the pipe being welded. Such tapering of the current prevents excessive heating which an enlarge the weld puddle and render it difficult to control.

Therefore, apparatus according to the present invention produces consistent welds with good penetration, a fairly uniform cross-section and allows for positive weld bead reinforcement as well as positive root reinforcement. Moreover, these welds can be made at a relatively high speed without the necessity for bevelling or the use of a backing ring.

Also in accordance with the present invention there is provided a welding method for forming a joint between two adjoining sections with a welding device. This method includes the steps of moving, with respect to each other, the welding device and the junction of two sections to melt a portion thereof. This method also includes the steps of applying a stream of gas to a melted portion of the joint trailing the welding device. The method also includes the step of feeding wire into the melted portion of the joint trailing the welding device.

BRIEF DESCRIPTION OF THE DRAWINGS

The above brief description as well as other objects, features and advantages of the present invention will be more fully appreciated by reference to the following detailed description of presently preferred but nonetheless illustrative embodiments in accordance with the present invention when taken in conjunction with the accompanying drawing which is a simplified end view of welding apparatus according to the present invention.

DETAILED DESCRIPTION OF THE PREFERRED EMBODIMENTS

With reference to the accompanying drawing, a weld means is shown as an arc welder having a tungsten electrode 10 which is coaxially mounted within a shielding hood 12. Shielding hood 12 conducts an inert gas that envelops and protects electrode 10. Electrode 10 and hood 12 are mounted alongside a workpiece 14 which, in this embodiment, are two adjacent tubular sections with their joints in the same plane as electrode 10. Sections 14 both rest upon and are rotated by a translation means shown herein as a pair of rollers 16 and 18, underlying sections 14. Sections 14 are rotated by rollers 16 and 18 so that the portion of the joint adjacent electrode 10 moves upwardly (rotates clockwise in this view).

A feed means is shown herein as a conventional wire feeder 20 which feeds filler wire 22 at a uniform rate into the joint of sections 14. Feeder 20 supplies an electrical current through filler wire 22 to pre-heat it.

The current supplied to tungsten electrode 10 is, preferably, gradually reduced as the sections 14 rotate past electrode 10. Such gradual reduction of the electrode current is produced by a supply means shown herein as block 23. The output 24 of block 23 is coupled to the high current supply associated with electrode 10 to regulate the flow of current through it. In a constructed embodiment the welding current was controlled by a Hobart Cybertig power supply whose current control potentiometer which was linked, by a gear reducer, to a small SCR-controlled permanent magnet motor. This device was arranged to provide several zones around the perimeter of sections 14 whereby the current is progressively reduced as each successive zone is entered.

An intermediate means is shown herein as conduit 26, mounted between electrode 10 and feeder 20. Conduit 26 is arranged to direct the flow of gas, preferably an inert gas with a small percentage of oxygen, into the weld puddle which trails behind electrode 10. It is expected that this gaseous flow from conduit 26 will produce several effects. Firstly, the back pressure produced by this gaseous flow tends to restrain the weld puddle from flowing downwardly underneath the electrode 10. Such flow under the electrode would interfere with weld penetration and cause the weld puddle to flare outwardly on the surface of sections 14. Secondly, the gaseous flow from conduit 26 tends to slightly cool the weld puddle, reducing its tendency to flow. Moreover, the addition of filler wire 22 in proximity to this gaseous flow tends to further reduce the local temperature of the weld puddle. Thirdly, for the situation where the gas issuing from conduit 26 is a mixture of an inert gas and oxygen, it is expected that a superficial surface oxidation occurs which facilitates the wetting and penetration of the weld.

It is significant to note that the gas provided by conduit 26 is spaced and oriented to prevent flow of the mixture of inert gas and oxygen into contact with the electrode 10. Such contact would tend to cause whiskering and thus degradation of electrode 10. It is to be appreciated that the inert gasses enveloping electrode 10 which are communicated through shielding hood 12 also tend to divert flow of the mixture of inert gas and oxygen from conduit 26 away from electrode 10.

It is to be noted that the preferred positioning of electrode 10 is illustrated herein although deviations from the preferred are expected. In this embodiment, the electrode 10 is inclined with its tip pointing upwardly with respect to horizontal at an angle B, preferably 7°. In addition, it is preferred that the tip of electrode 10 be positioned between $\frac{1}{8}$ inch to $\frac{1}{2}$ inch above the center line C of sections 14. Also, it is preferred that filler wire 22 be inserted into the weld puddle produced by electrode 10 near the edge of that weld puddle.

By way of example but not limitation, the following is a summary of the various parameters at which welding was successfully performed:

| | |
|---|---|
| Tubing: | 2.25" OD × 0.200"W SA-213 T2 |
| Interspace Between Tubing: | Touching |
| Torch Angle: | 7° |
| Torch Centerline Position: | +$\frac{1}{8}$ inch (above tube centerline) |
| Rotation: | Clockwise at 9 inches per minute |
| Current: | Pulsed Current 5 current changes occurring at 5 equally spaced intervals |
| Average Current Change: | 6 Amps/Zone |
| Average High Pulse Current: | 282 Amps |
| Average Low Pulse Current: | 246 Amps |
| Arc Voltage: | 10–12.5 Volts |
| Pulse Frequency: | 1.7 Hertz |
| Wire Diameter and Type: | 0.035 inch diameter, 1$\frac{1}{4}$ Cr. - $\frac{1}{2}$ Mo. |
| Hot Wire Feed: | 67 inches per minute |
| Hot Wire Current: | Approximately 70 Amps AC |
| Hot Wire Volts: | Approximately 3.5 Volts |
| Shielding Gas Torch: | 12 CFH Argon + 3 CFH Helium |
| External Shielding: | 5 CFH M-5 (95% Ar + 5% O$_2$) |
| Weld Time: | 50.5 seconds |

It is to be appreciated that these parameters can be adjusted depending upon the speed of rotation, the thickness of the material being welded, the current flow etc. The foregoing were parameter settings for welding at a speed of 9 inches per minute. The parameters which were varied to allow welding at 12 inches per minute were: the spacing between the tubing, the current applied to electrode 10, the volume of oxygen through conduit 26 and certain parameters associated with filler wire 22. These parameters are listed below for the 12 inch per minute example:

| | |
|---|---|
| Tubing: | 2.5 inch OD × 0.200 inch SA-213 T2 |
| Interspace Between Tubing: | 0.035 inch |
| Torch Angle: | 7° |
| Torch Position: | +$\frac{1}{8}$ inch (above tube centerline) |
| Rotation: | Clockwise at 12 inches per minute |
| Current Mode for Torch: | Steady State: 3 Current Zones: #1 - 292 amps #2 - 282 amps #3 - 284 amps |
| Arc Voltage: | 10–12 Volts |
| Hot Wire Feed: | 70 inches per minute |
| Hot Wire Current: | 75 Amps |
| Hot Wire Voltage: | 3.5 Volts |
| Shielding Gas: | 12 CFH Argon + 4 CFH Helium |
| External Shielding: | 14 CFH M-5 |
| Welding Time: | 41 seconds |
| Wire Diameter & Type: | 0.035 inch diameter (1$\frac{1}{4}$ Cr - $\frac{1}{2}$ Mo) |

As previously mentioned the foregoing parameters are illustrative and it is expected that skilled practitioners will vary them somewhat to satisfy the requirements of different materials, thicknesses etc.

It is also expected that for some embodiments the ends of the pipe which are to be welded may be bevelled or chamfered to facilitate welding and to further increase welding speed. It is also anticipated that for some embodiments where larger pipe is to be welded at relatively high speed, a secondary electrode will be mounted vertically above the pipe being welded. Such an auxiliary electrode can be used to independently melt the filler wire. This feature will allow good control over the weld puddle since the melted filler wire does not merge with the weld puddle produced by the main electrode. This auxiliary electrode can be operated after the main electrode has traversed the entire perimeter of the joint of the sections 14 to form a concave weld. Thereafter, the auxiliary electrode can be ignited and filler wire inserted to fill the concavity.

It is apparent that the shapes, outlines and materials described herein may be modified to suit the speed, capacity and other variables required in a specific welding operation. Therefore, a latitude of modification, change and substitution is intended in the foregoing disclosure and in some instances some features of the invention will be employed without a corresponding use of other features. Accordingly, it is appropriate that the appended claims be construed broadly and in a manner consistent with the spirit and scope of the invention.

What is claimed is:

1. Welding apparatus for forming a joint between two sections comprising:
    weld means for welding together portions of said two sections adjacent said weld means, said weld means including an electrode adjacent said joint;
    a shielding hood encircling said weld means, said shielding hood encircling said electrode;
    feed means spaced a given distance from said weld means for feeding filler wire into a melted portion of said joint;
    translation means for producing relative motion between said joint and said weld means; and
    intermediate means for applying a stream of gas to said joint at a location said feed means and said weld means, said stream of gas being directed to restrict flow of said gas toward said weld means and to urge said melted portion of said joint in a direction to allow joining of said two sections, said stream of gas being composed differently than the gaseous ambient within said shielding hood, said intermediate means comprising: a conduit spaced from said hood for conducting said gas to a region of said joint outside said hood, said hood being outside of said conduit.

2. Welding apparatus according to claim 1 wherein said gas includes a mixture of inert gas and oxygen.

3. Welding apparatus according to claim 2 wherein said feed means is operable to electrically heat said wire.

4. Welding apparatus for forming a joint between two tubular sections comprising:
    weld means for welding together portions of said two sections adjacent said weld means, said weld means including an arc welder having an electrode;
    a shielding hood encircling said weld means;
    feed means spaced a given distance from said weld means for feeding filler means into a melted portion of said joint, said feed means being operable to feed wire into the melted portion of said joint above said weld means at a distance sufficient to allow said wire to melt without running downwardly to interfere with said weld means;
    translation means for producing relative motion between said joint and said weld means, said translation means being operable to horizontally support and align together said tubular sections, said translation means being operable to synchronously rotate said tubular sections about their axes, said weld means being mounted along that side of said joint which translates upwardly upon rotation thereof by said translation means;
    intermediate means for applying a stream of gas to said joint at a location between said feed means and said weld means, said stream of gas being directed to restrict flow of said gas toward said weld means and to urge said melted portion of said joint in a direction to allow joining of said two sections, said stream of gas being composed differently than the gaseous ambient within said shielding hood; and
    supply means for providing to said arc welder a current having a non-zero magnitude which decreases in response to rotation of said tubular sections, said gas including oxygen.

5. Welding apparatus according to claim 4 wherein said electrode points upwardly and has its tip located above the axes of said tubular sections.

6. Welding apparatus according to claim 5 wherein said electrode is inclined at 7° with respect to horizontal.

7. Welding apparatus according to claim 4 wherein said electrode is located about a horizontal radius of said tubular sections.

8. Welding apparatus for forming a joint between two tubular sections, comprising:
    translations means for horizontally supporting and aligning together said two tubular sections, said translation means being operable to synchronously rotate said two tubular sections about their axes;
    weld means for welding together that portion of said two sections passing by said weld means to progressively form said joint, said weld means being mounted along that side of said joint which translates upwardly upon rotation thereof by said translation means so that gravity urges melted portions of said joint to a leading position, said weld means including an arc welder having an electrode;
    supply means for providing to said arc welder a current having a non-zero magnitude which decreases in response to rotation of said tubular sections; and
    feed means for feeding electrically heated filler wire into the melted portion of said joint above said weld means at a distance sufficient to allow said wire to melt without running downwardly to interfere with said weld means.

9. Welding apparatus according to claim 8 further comprising:
    intermediate means for applying a stream of gas to said joint at a location between said feed means and said weld means.

10. Welding apparatus according to claim 9 wherein said gas includes oxygen.

11. Welding apparatus according to claim 8 wherein said weld means includes:
    a shielding hood encircling said electrode; and
    a source of helium and argon coupled into said hood.

12. Welding apparatus according to claim 8 wherein said electrode points upwardly and has its tip located above the axes of said tubular sections.

13. Welding apparatus according to claim 12 wherein said electrode is inclined about 7° from the horizontal.

14. Welding apparatus according to claim 8 wherein said weld means is located about a horizontal radius of said tubular sections.

* * * * *